United States Patent [19]

Myers et al.

[11] Patent Number: 5,247,601
[45] Date of Patent: Sep. 21, 1993

[54] ARRANGEMENT FOR PRODUCING LARGE SECOND-ORDER OPTICAL NONLINEARITIES IN A WAVEGUIDE STRUCTURE INCLUDING AMORPHOUS $SIO_2$

[76] Inventors: Richard A. Myers, 801 Locust Pl. NE., Apt. 2019, Albuquerque, N. Mex. 87102; Nandini Mukherjee, 1423 Madison NE., Albuquerque, N. Mex. 87110; Steven R. J. Brueck, 5601 Cometa Ct., Albuquerque, N. Mex. 87111

[21] Appl. No.: 879,638

[22] Filed: May 7, 1992

Related U.S. Application Data

[63] Continuation-in-part of Ser. No. 767,298, Sep. 27, 1991.

[51] Int. Cl.$^5$ .............................................. G02F 1/37
[52] U.S. Cl. ................................... 385/122; 359/328; 359/332
[58] Field of Search ................... 359/328, 329, 332; 385/122

[56] References Cited

U.S. PATENT DOCUMENTS

5,013,115  5/1991  Kashyap ................................. 359/328

OTHER PUBLICATIONS

Österberg. U and Margulis. W. Opt. Lett. 11 516 (Aug. 1986).
Stolen; R. H.; Tom, H. W. K, Opt. Lett. 12, 585 (Aug. 1987).
Anderson, D. Z.; Mizrahi V.; Sipe; J. E.; Opt. Lett. 16, 796 (Jun. 1991).
Kamal, A. et al. Digest of Optical Society of America Annual Meeting, Optical Society of America, Washington, D.C. Nov. 1990 paper PD25.
Mukherjee A.; Brueck, S. R. J.; Wu, A. Y., Opt. Commun. 76, 220 (May 1990).
Carvalho, I. C. S. et al., "Proc. of the 1991 Conference on Lasers and Electrooptics" Optical Society of America Washington, D.C., May 1991 Paper JTuA3.
"Determination of the Nonlinear Optical Susceptibility $R^2$ of Surface Layers by Sum and Differences Frequency Generation in Reflection and Transmission" by Dick et al. Appl. Phys. B38 107-116 (1985).
"Large Second-Order Nonlinearity in Poled Fused Silica" by Myers; Optics Letters/vol. 16, No. 22, Nov. 15, 1991.

*Primary Examiner*—Frank Gonzalez

[57] ABSTRACT

A large second order nonlinearity is induced in $SiO_2$ portions of a waveguide enabling inducement of second order harmonic waves in the waveguide for numerous applications in integrated optics and optoelectronics.

15 Claims, 2 Drawing Sheets

ARRANGEMENT FOR PRODUCING LARGE SECOND-ORDER OPTICAL NONLINEARITIES IN A WAVEGUIDE STRUCTURE INCLUDING AMORPHOUS SiO₂

This invention was made in the performance of work under contracts with the Department of the Air Force and the Defense Advanced Research Projects Agency (DARPA).

This patent application is a continuation-in-part of U.S. patent application Ser. No. 07/767,298 filed on Sep. 27, 1991, entitled "Method and Apparatus for Creating Large Second-Order Nonlinearities in Fused Silica" (now allowed).

BACKGROUND OF THE INVENTION

There has been a substantial effort extending over many years aimed at finding suitable nonlinear optical materials for applications in integrated optics and optoelectronics. Electrooptic switching and second-harmonic generation are processes that require materials possessing second-order nonlinear susceptibilities. In order to posses a non-vanishing second-order nonlinearity, the material must lack a macroscopic inversion symmetry, i.e. it must have a preferred directionality. In such materials, the polarization induced by an electromagnetic field has a term which responds to the square of the electric field. For optical switching, an applied DC or low-frequency field can modulate the material response to an optical field leading to optical modulation and/or switching. In second harmonic generation, the polarization of the second harmonic is proportional to the square of the applied optical field at the fundamental (first harmonic) frequency.

A thin film waveguide structure of low loss materials possessing a second-order nonlinearity will have significant impact on optoelectronics. In addition, compatibility and integrability with semiconductor optoelectronics will lead to a major simplification and growth of the market for these devices. There is existing, commercially available technology employing LiNbO₃ waveguides, for example, in waveguide switches for optical crossbar applications. These LiNbO₃ switches are, however, based on a bulk crystal technology which is not directly compatible with semiconductors such as Si and GaAs or other III-V compounds that widely used in optoelectronics.

Although wide classes of nonlinear optical materials exemplified by KNbO₃, PLZT, β-Barium Borate, doped polymers, etc. have been investigated for monolithic integration with semiconductors, no practical devices have yet emerged that meet all the requirements of manufacturability, cost, reliability, and functionality for integrated optoelectronic device applications. $SiO_2$, which is well known for its near-ideal linear optical properties, is an ideal low loss (<1db/Km) material for waveguide applications. $SiO_2$ has the additional advantage of being a dominant material in metal-oxide based integrated circuit technology. Silicon oxides are widely used in III-V optoelectronic device technology as well. $SiO_2$ is among the most manufacturable of materials for electronic and optical applications. Numerous processes have been developed for its deposition including: oxidation of Si, CVD growth from a wide variety of precursors, spin-on sol-gel processes, flame deposition, etc. Each of these has been extensively investigated and developed. The wealth of knowledge and the diverse capabilities for the manufacture of $SiO_2$ and its integration with semiconductors is without peer for any other material.

The $SiO_2$ resulting from almost all of these deposition and growth processes is amorphous and, thus, possesses a macroscopic inversion symmetry. Hence, it cannot exhibit a second-order nonlinearity. Recently, however, we have discovered a technique for inducing a large second-order susceptibility in such material by a temperature-electric field poling process. This is described in our aforementioned copending U.S. patent application Ser. No. 07/767,298 (now allowed). The nonlinear coefficients obtained are comparable to those of LiNbO₃.

SUMMARY OF THE INVENTION

In accordance with the present invention the poling technique of the invention described in U.S. patent application Ser. No. 07/767,298 (now allowed) is applied to a layered material structure which both provides for an optical waveguide to confine the optical propagation (i.e. integrated optics) and for a charge trapping mechanism to produce the nonlinearity. The long interaction lengths inherent in low-loss waveguides, and the convenient charge storage medium and integration with semiconductors, provide a near ideal material system for switching and frequency conversion processes. This layered structure may consist of $Si_3N_4$ and $SiO_2$ layers grown on Si. The $Si_3N_4/SiO_2$ interface is well known as a rich source of charge trapping sites. This structure forms the basis of nonvolatile memory devices such as Erasable-Programmable-Read Only-Memory (EPROM) and Nonvolatile-Random-Access-Memory (NVRAM). In these devices, charges injected from the silicon across the $SiO_2$ are trapped at the $Si_3N_4/SiO_2$ interface. These stored charges cause a threshold voltage shift. The charge retention time can be many years. To remove the stored charges and return the device its original threshold voltage, a gating voltage or other means such as UV irradiation is used. Frequently, an oxide capping layer above the nitride layer is used to provide added stability. For these electronic applications typical layer thicknesses are 10 s of nm to allow for charge tunneling across the oxide layer to the nitride.

The refractive indices for $SiO_2$ and $Si_3N_4$ at 1.06 μm are 1.46 and 2.05, respectively. Thus, in accordance with the invention a monolithically grown multilayer structure of $Si_3N_4/SiO_2$ is ideal for waveguiding. In fact, this structure has been investigated as a waveguide structure for coupling of fibers and semiconductor lasers and detectors. Also advantage is taken of the micromachining possibilities of Si.

Efficient second harmonic generation requires velocity matching between the induced second harmonic polarization which propagates at the velocity of the fundamental and the freely propagating second harmonic wave. This velocity- or phase-matching condition is fulfilled when the modal indices of refraction at the fundamental and second harmonic are the same. This is a difficult constraint and has held back the application of nonlinear processes in waveguides as well as in isotropic bulk media.

In accordance with the invention, quasi-phase-matching is employed to improve the efficiency of waveguide and bulk nonlinear processes. In quasi-phase-matching, the sign of the nonlinearity is reversed every coherence length (i.e., the length over which the phases of the fundamental and second harmonic fields are shifted by $\pi$ because of their different velocities). In this way, the energy flow between the fundamental and second harmonic is retained in the positive direction and the second harmonic intensity continues to grow as both beams propagate down the waveguide. An alternate technique is simply to remove the nonlinearity for every other coherence length. Thus, the fields only interact constructively and the interaction is removed when the phases are such that they would interact in the opposite direction and transfer energy back into the fundamental. An important aspect of the present invention is that it allows for erasure of the nonlinearity by ultraviolet irradiation. This provides a mechanism for erasing the nonlinearity on the spatial scale of the coherence length (10 s of microns) to provide for this quasi-phase-matching.

BRIEF DESCRIPTION OF THE DRAWINGS

Reference is now made to the drawings in which.

DETAILED DESCRIPTION OF THE INVENTION

Figure 1:
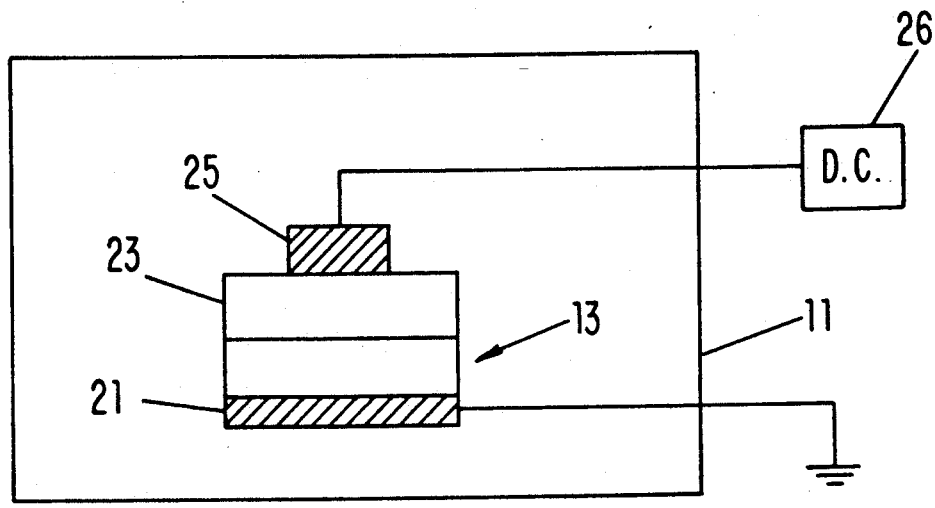
FIG. 1 is an illustration of a poling arrangement for an $SiO_2/Si_3N_4/SiO_2$ waveguide in accordance with an embodiment of the present invention.
Figure 2:
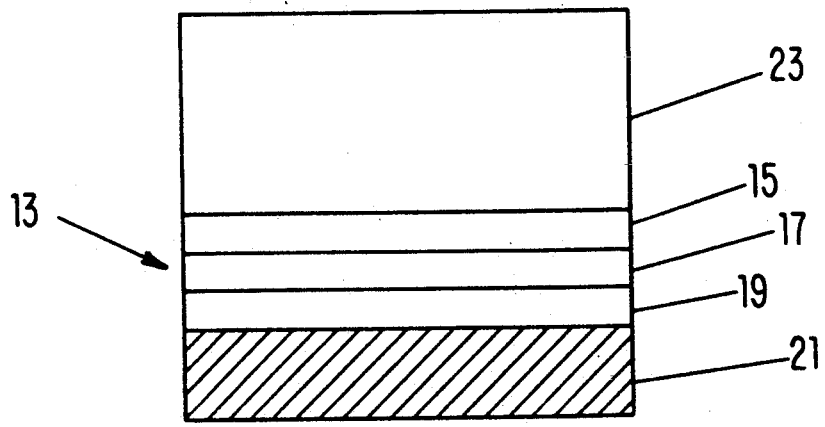
FIG. 2 is a view of a waveguide specimen in accordance with an embodiment of the invention.

Referring to FIG. 1, there is provided an oven 11 to provide heat for poling a multilayered semiconductor structure 13 shown in detail in FIG. 2. The structure 13 includes an upper thin film cladding layer 15 of $SiO_2$ which may be from about 5 nm to about 3 microns thick, a central guiding layer 17 of $Si_3N_4$ from about 200- to about 1000-nm thick, and a lower thin film layer 19 of $SiO_2$ with thickness from about 30 nm to mm's which may be supported by a substrate 21 of Si, GaAs, or a metal. The thickness of the guiding layer 17 $Si_3N_4$ depends on whether it is designed as a single mode or multimode waveguide. For purpose of poling the structure 13, it is capped with a removable slab 23 layer of $SiO_2$ about 1.6 mm or greater thickness. The purpose of the slab 23 is to prevent electrical breakdown of the structure 13 when poled in the oven. This capping may be accomplished with a simple physical contact between the capping layer and the waveguide structure without using elaborate polishing or other fabrication techniques.

As shown in FIG. 1, the multilayered structure 13 is placed in the oven with its cap or slab 23 in place. An electrode 25 is placed on top of the slab 23. The substrate 21 serves as ground. To produce poling of the multilayered structure 13, there is provided in the oven an electrode 25 powered by any suitable source 26 of positive or negative D.C. voltage. The electrode 25 may be of stainless steel, silicon or aluminum or any other suitable material.

The poling procedure is as follows: The multilayered structure is placed in the oven which may be evacuated or contain ambient air. The structure 13 is inserted in the oven so that the electrode 25 is in intimate physical contact with the cap or slab 23. The substrate 21 serves as ground. The structure 13 is then heated in an air ambient in the oven to temperatures in the range from about 220° C. to about 320° C. The temperature-time profile includes a heating period (30 minutes), a time-at-temperature (10 minutes) with an applied bias voltage of 3-5 kV, followed by a cooling period to room temperature with the bias applied. During the heating, the electrode 25 is in physical contact with the 1.6-mm thick $SiO_2$ bulk piece. The 3-5 kV bias is applied across both the sample and the $SiO_2$ bulk material to prevent electrical breakdown.

In carrying out poling in accordance with the invention, the thickness of the slab 23 and the substrate 21 may be varied. Also, more complex waveguide structures involving multiple layers of thin films may be used.

One technique for monitoring the extent of second harmonic generation occurring in the multilayered structure poled as described above is by impinging a pulsed YAG laser beam (1.06 $\mu$m, 10-ns pulse width, power density $\sim 10$ MW/cm$^2$, spot diameter 1 mm) as the fundamental source onto said multilayered structure. The intensity of the second-harmonic light at 532 nm generated in the structure is monitored with a photomultiplier in a reflection geometry with a p-polarization of the fundamental at angle of incidence $\sim 50°$ to the normal.

The observed results are that:

1. The magnitude of the signal is the same order as observed in the bulk fused silica samples described in the aforementioned copending patent application Ser. No. 07/767,298 (now allowed). The susceptibility is close to the $d_{22}$ coefficient of $LiNbO_3$.

2. While the nonlinearity is formed by a relatively modest thermal stress ($\sim 300°$ C.), it appears to be quite long-lived at room temperature. Heating of the samples again with no applied field causes the nonlinearity to decrease below measurement sensitivities. Local erasure of the nonlinearity with irradiation from a UV source has also been observed. This is important for quasi-phasematching in nonlinear frequency conversion (second harmonic and sum and difference frequency mixing) as will be discussed below.

3. the nonlinearity is uniform across the area subjected to the electric field.

One possible explanation for the second order nonlinearity produced in the multilayered structure 13 is that it is produced or created via a field-induced third-order effect. Under this theory the stored charges at the interface of $Si_3N_4$ (layer 17)/$SiO_2$ (layer 19) along with charged carriers of opposite sign at the substrate (layer 21)/$SiO_2$ (layer 19) interface generate a large internal DC field. This DC field then interacts with the $SiO_2$ (layer 19) third-order susceptibility, to produce the large effective second-order nonlinearity. The $Si_3N_4$/$SiO_2$ interface provides the necessary traps for the charged carriers. These charged carriers can be liberated from the traps upon UV irradiation or application of heat. While this is our proposed mechanism, the applications do not depend upon this as a mechanism, they only require the formation of the nonlinearity which we have experimentally demonstrated.

Figure 3:
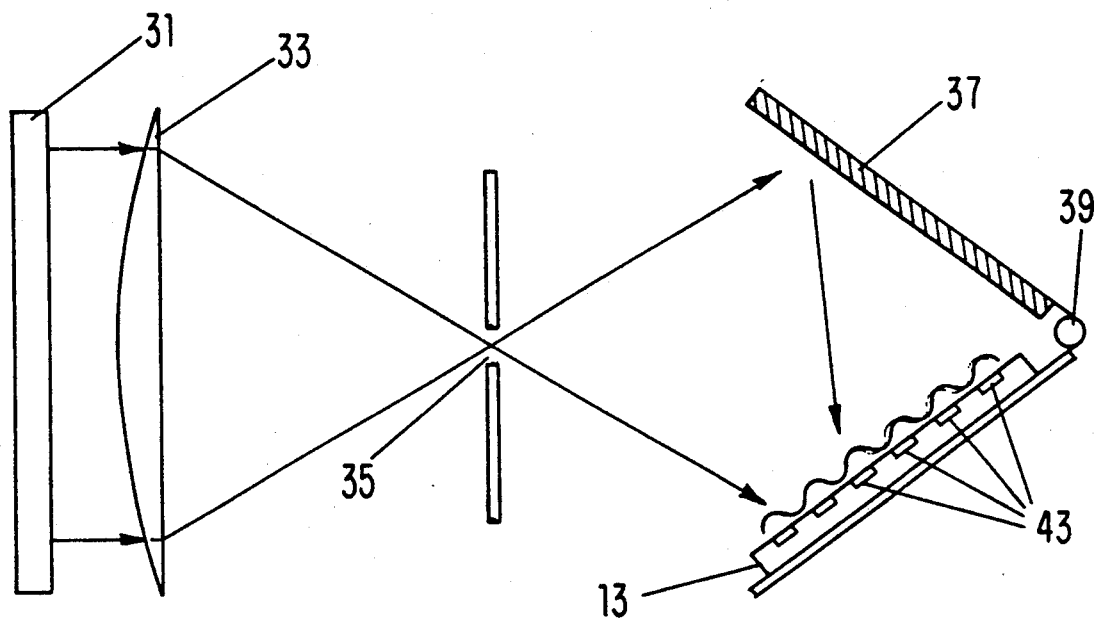
FIG. 3 is a schematic diagram of a quasi-phase-matching arrangement for the second order wave with UV erasure in accordance with an embodiment of the invention.
Figure 4:
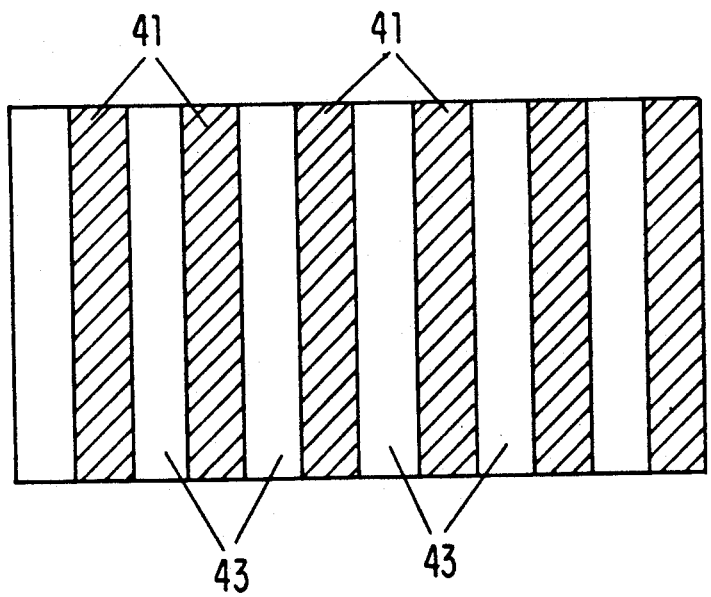
FIG. 4 is a top view of a waveguide indicating quasi-phase-matching in accordance with an embodiment of the invention.

Reference is now made to the embodiment shown in FIGS. 3 and 4 in connection with which quasi-phasematching of the waveguide structure 13 is accomplished with UV erasure. Here, a source 31 of UV at 257 nm is provided by an Ar laser. The UV is passed through a 10× microscope objective lens 33 for focus at a 10 micron aperture 35 from which the divergent UV radiation is passed to a mirror 37 and to the top surface of a waveguide structure 13. The mirror 37 and waveguide structure 13 are maintained at an angle to each other so that the UV radiation reaching the mirror 37 is reflected onto the top surface of the structure 13. The mirror 37 and the structure may be rotated relative to each other about a pivot 39 to allow variation in the periodicity of the erasure.

As explained earlier, in quasi-phase-matching, the sign of the nonlinearity is reversed or removed every coherence length. As shown in FIG. 4, the portions of nonlinearity are indicated as the cross hatched areas 41. The areas 43 adjacent to the nonlinear portion represent portions where the second harmonic signal would be decreased by coupling of energy back into the fundamental wave. It is these areas 43 in which the nonlinearity is eliminated by the UV radiation in accordance with the invention. This is accomplished by adjusting the angle between the mirror 37 and the waveguide structure 13 so that the interference pattern at the surface of the waveguide 13 produces UV radiation zones coincident with the phase mismatch portions 43 present in the propagation path in the waveguide. The UV radiation eliminates the subtractive portions so the energy flow between the fundamental and the second harmonic is retained in the positive direction and the second harmonic wave intensity grows as both the fundamental and the second harmonic propagate down the waveguide. Of course, other techniques well known in this art may be employed to ensure additive interaction of the fundamental and second harmonic waves.

It will be apparent to those skilled in this art that the present invention has many uses and applications and can be practiced otherwise than we specifically described herein. Some of the advantages afforded by this invention are:

- compatibility with semiconductors and semiconductor processing, readily manufactured multilayer structures,
- manufacturability of transverse guiding structures and of gratings and other structures for guiding optical propagation and transferring energy between structures, and
- the unique combination of linear (for low loss guiding and transmitting light) and nonlinear (for switching and frequency conversion) optical properties.

There are a host of applications for the invention, some of which are listed here.

- integrated Mach-Zender interferometers and other switching structures-for high-speed switching, A/D conversion, waveguide crossbar switches, etc.;
- electronically tunable filters for communications multiplex/demultiplex;
- waveguide optical parametric oscillators;
- waveguide sum and difference frequency generation;
- second harmonic generation in waveguides with counter-propagating fundamental frequency beams.

Of course, other arrangements and applications of the invention will occur to skilled workers in this art.

We claim:

1. A body of material comprising a plurality of discrete portions defining at least one interface between two of said portions, one of said two portions having an index of refraction with respect to an electromagnetic wave lower than that of the other portion, there being a second interface between said other portion and air, air having a lower index of refraction than said other portion, said one portion comprising $SiO_2$ and characterized by having a second order nonlinearity whereby, with the propagation of said electromagnetic wave in said body including in said other portion, there is induced in the $SiO_2$ portion having said nonlinearity a wave that is at the second harmonic frequency of said electromagnetic wave, said second harmonic wave having components propagating in the other portion not having the second order nonlinearity.

2. The body of claim 1 wherein said plurality of portions includes a third portion comprised of $SiO_2$ having an interface with said other portion, said third portion having an index of refraction lower than that of said other portion and also characterized by having a second order nonlinearity, whereby with the propagation of components of said electromagnetic wave in said body, there is induced in the third portion a wave that is at the second harmonic frequency of said electromagnetic wave, said second harmonic wave having components propagating in said other portion.

3. The body of claim 1 wherein the portion not having the second order nonlinearity is comprised of $Si_3N_4$.

4. The body of claim 2 wherein the portion not having the second order nonlinearity is comprised of $Si_3N_4$.

5. The body of claim 1 wherein said body further includes a substrate portion adjacent one of the portions having the second order nonlinearity.

6. The body of claim 2 wherein said body further includes a substrate portion adjacent one of the portions having the second order nonlinearity.

7. The body of claim 3 wherein said body further includes a substrate portion adjacent one of the portions having the second order nonlinearity.

8. The body of claim 7 wherein the substrate is comprised of a substance from the group consisting of Si, $SiO_2$, GaAs, and any metal.

9. The body of claim 2 wherein the electromagnetic wave is substantially in the optical range.

10. The body of claim 4 wherein one of the $SiO_2$ portions having the second order nonlinearity is a layer having a thickness in the range from about 5 nanometers to about 3 microns, the other $SiO_2$ portion is a layer having a thickness in the range from about 30 nanometer to bulk, and the $Si_3N_4$ portion is a layer having a thickness in the range from about 200 nanometers to about 1100 nanometers.

11. Apparatus for enhancing a second harmonic wave in a waveguide body characterized by a central guiding layer abutted on each side by a layer of $SiO_2$ of index of refraction less than that of central guiding layer, each of said $SiO_2$ layers having a second order nonlinearity throughout its material whereby with the propagation of an electromagnetic wave at a fundamental frequency in said waveguide body, a second harmonic of said electromagnetic wave is induced in the waveguide body, the components of said second harmonic tending to destructively interfere due to phase mismatches between the induced second harmonic wave and the fundamental wave as they are propagated, said apparatus comprising means for compensating for the phase mismatching between the induced second harmonic polarization which propagates at the velocity of the fundamental wave and the freely propagating second harmonic wave.

12. Apparatus as in claim 11 wherein said means includes means for establishing an interference pattern of UV radiation incident onto said body, and means for adjusting the period of said interference pattern so as to remove said second order nonlinearity in UV-illuminated regions at the anti-nodes of said interference pattern and not in the non-UV-illuminated regions at the nodes of the interference pattern, the period of the interference pattern being chosen to match the coherence length between the fundamental electromagnetic wave and said second harmonic wave.

13. The method of producing, in a waveguide body wherein layers of $SiO_2$ comprise cladding which define the boundaries of the waveguide, a second order electromagnetic nonlinearity in said $SiO_2$ layers comprising the steps of:

a) heating the waveguide body to a temperature in a range wherein the lowest temperature is about 200 degrees C.;

b) applying a d.c. bias across said waveguide body, and c) cooling said waveguide body while maintaining said bias until said body reaches approximately room temperature.

14. The method of claim 13 wherein said waveguide body is provided with a removable body of bulk material abutting one of said $SiO_2$ layers to prevent electrical breakdown of the waveguide body.

15. A body of material comprising a plurality of discrete portions defining at least two interfaces between three of said portions, there thus being a middle portion abutted by two outer portions, the two outer portions having a lower index of refraction than that of the middle portion with respect to an electromagnetic wave, at least one of said outer portions comprising $SiO_2$ characterized by having a second order nonlinearity whereby, with the propagation of the components of the electromagnetic wave in said body, the index of refraction experienced by said electromagnetic wave in said $SiO_2$ portion may be varied by an applied electrical field.

* * * * *